United States Patent
Lu et al.

(10) Patent No.: US 9,671,902 B2
(45) Date of Patent: Jun. 6, 2017

(54) LIQUID CRYSTAL DISPLAY HAVING TOUCH FUNCTION AND TOUCH DETECTION METHOD THEREOF

(71) Applicant: Shenzhen China Star Optoelectronics Technology Co., Ltd., Shenzhen, Guangdong (CN)

(72) Inventors: Yucheng Lu, Guangdong (CN); Chunpeng Guo, Guangdong (CN); Zhenzhou Xing, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 167 days.

(21) Appl. No.: 14/433,612

(22) PCT Filed: Dec. 17, 2014

(86) PCT No.: PCT/CN2014/094062
§ 371 (c)(1),
(2) Date: Apr. 3, 2015

(87) PCT Pub. No.: WO2016/090656
PCT Pub. Date: Jun. 16, 2016

(65) Prior Publication Data
US 2016/0342277 A1    Nov. 24, 2016

(30) Foreign Application Priority Data
Dec. 10, 2014  (CN) .......................... 2014 1 0758623

(51) Int. Cl.
*G06F 3/041* (2006.01)
*G02F 1/133* (2006.01)
(Continued)

(52) U.S. Cl.
CPC .......... *G06F 3/0418* (2013.01); *G02F 1/1368* (2013.01); *G02F 1/13306* (2013.01);
(Continued)

(58) Field of Classification Search
CPC ...... G06F 3/0418; G06F 3/0412; G06F 3/044; G02F 1/13306; G02F 1/13338;
(Continued)

(56) References Cited

U.S. PATENT DOCUMENTS

2012/0038585 A1* 2/2012 Kim ..................... G06F 3/0412
                                                          345/174

* cited by examiner

*Primary Examiner* — Charles Hicks
(74) *Attorney, Agent, or Firm* — Andrew C. Cheng

(57) ABSTRACT

The present invention discloses a liquid crystal display having touch function and a touch detection method thereof. The liquid crystal display comprises a display module and a touch module, and the display module and the touch module share a common electrode. The display module sequentially executes a plurality of operations of gate drive and gray scale drive in each frame. The touch module executes operations of touch detection as the display module executes a present operation of gate drive and gray scale drive and a voltage of the common electrode is in stable. With the aforementioned arrangement, the present invention is capable of reducing the interference of the display signals and the touch signals to improve the display quality and touch effect.

13 Claims, 2 Drawing Sheets

(51) Int. Cl.

| | |
|---|---|
| *G02F 1/1333* | (2006.01) |
| *G02F 1/1343* | (2006.01) |
| *G02F 1/1362* | (2006.01) |
| *G02F 1/1368* | (2006.01) |
| *G06F 3/044* | (2006.01) |
| *G09G 3/20* | (2006.01) |
| *G09G 3/36* | (2006.01) |

(52) U.S. Cl.
CPC ...... *G02F 1/13338* (2013.01); *G02F 1/13439* (2013.01); *G02F 1/134309* (2013.01); *G02F 1/136286* (2013.01); *G06F 3/041* (2013.01); *G06F 3/044* (2013.01); *G06F 3/0412* (2013.01); *G09G 3/2018* (2013.01); *G09G 3/3677* (2013.01); *G09G 3/3688* (2013.01); *G02F 2201/121* (2013.01); *G02F 2201/123* (2013.01); *G09G 2310/027* (2013.01); *G09G 2310/067* (2013.01); *G09G 2310/08* (2013.01)

(58) Field of Classification Search
CPC ........... G02F 1/134309; G02F 1/13439; G02F 1/136286; G02F 1/1368; G09G 3/2018; G09G 3/3688
See application file for complete search history.

LIQUID CRYSTAL DISPLAY HAVING TOUCH FUNCTION AND TOUCH DETECTION METHOD THEREOF

FIELD OF THE INVENTION

The present invention relates to a liquid crystal display technology field, and more particularly to a liquid crystal display having touch function and a touch detection method thereof.

BACKGROUND OF THE INVENTION

The liquid crystal display having touch function and display function in one has been gradually popular. The In-cell technology which the capacitive touch function is integrated into the pixels of the liquid crystal display panel becomes the development direction of this field because its characteristic capable of realizing thinness and light weight for the liquid crystal display panel. In the liquid crystal display panel of in-cell technology, the common electrode is generally employed for the touch electrodes to transmit and receive touch signals. However, the common electrode also is employed for transmitting and receiving display signals. The interference of the display signal and the touch signal can happen so easily and influence the touch effect and display quality of the liquid crystal display, accordingly.

SUMMARY OF THE INVENTION

The major technical issue that the present invention is to solve is to provide a liquid crystal display having touch function and a touch detection method thereof for reducing the interference of the display signals and the touch signals to improve the display quality and touch effect.

For solving the aforesaid technical issues, one technical solution employed by the present invention is: to provide a liquid crystal display having touch function, comprising a display module and a touch module, and the display module and the touch module share a common electrode, and the display module sequentially executes a plurality of operations of gate drive and gray scale drive in each frame, and the touch module executes operations of touch detection as the display module executes a present operation of gate drive and gray scale drive and a voltage of the common electrode is stable; wherein the touch module finishes a present operation of touch detection before the display module executes a next operation of gate drive and gray scale drive; the display module comprises a gate driver, a data driver, a plurality of gate lines arranged in parallel and a plurality of data lines arranged in parallel and insulated, intersected with the gate lines, and the gate lines and the data lines define a plurality of pixel areas arranged in array, and the display module further comprises a TFT and a pixel electrode located at each pixel area, and gates of the TFTs are correspondingly coupled to the gate lines, and sources of the TFTs are correspondingly coupled to the data lines, and drains of the TFTs are correspondingly coupled to the pixel electrodes, and the common electrode and the pixel electrodes are oppositely located, and the gate driver sequentially provides gate drive signals to the gate lines for sequentially activating the TFTs corresponded with the gate lines, and the data driver provides gray scale drive signals to the data lines for applying the gray scale drive signals to the pixel electrodes via the activated TFTs, and the touch module executes the operations of touch detection as the gate driver provides the gate drive signals, and the data driver provides the gray scale drive signals, and the voltage of the common electrode is stable.

The touch module comprises touch electrodes oppositely located with the common electrode and a touch circuit coupled to the touch electrodes and the common electrode, wherein the touch circuit applies drive signals to one of the common electrode and the touch electrodes and acquires detection signals from the other of the common electrode and the touch electrodes for implementing detection to capacitance variations between the common electrode and the touch electrodes which are caused by touch operations.

The touch electrodes are a plurality of strips, and the number of the touch electrodes is less than the number of the gate lines such that the touch circuit executes the operation of touch detection to each touch electrode at least twice in each frame.

For solving the aforesaid technical issues, another solution provided by the present invention is: to provide a liquid crystal display having touch function, comprising a display module and a touch module, and the display module and the touch module share a common electrode, and the display module sequentially executes a plurality of operations of gate drive and gray scale drive in each frame, and the touch module executes operations of touch detection as the display module executes a present operation of gate drive and gray scale drive and a voltage of the common electrode is stable.

The touch module finishes a present operation of touch detection before the display module executes a next operation of gate drive and gray scale drive.

The display module comprises a gate driver, a data driver, a plurality of gate lines arranged in parallel and a plurality of data lines arranged in parallel and insulated, intersected with the gate lines, and the gate lines and the data lines define a plurality of pixel areas arranged in array, and the display module further comprises a TFT and a pixel electrode located at each pixel area, and gates of the TFTs are correspondingly coupled to the gate lines, and sources of the TFTs are correspondingly coupled to the data lines, and drains of the TFTs are correspondingly coupled to the pixel electrodes, and the common electrode and the pixel electrodes are oppositely located, and the gate driver sequentially provides gate drive signals to the gate lines for sequentially activating the TFTs corresponded with the gate lines, and the data driver provides gray scale drive signals to the data lines for applying the gray scale drive signals to the pixel electrodes via the activated TFTs, and the touch module executes the operations of touch detection as the gate driver provides the gate drive signals, and the data driver provides the gray scale drive signals, and the voltage of the common electrode is stable.

The touch module comprises touch electrodes oppositely located with the common electrode and a touch circuit coupled to the touch electrodes and the common electrode, wherein the touch circuit applies drive signals to one of the common electrode and the touch electrodes and acquires detection signals from the other of the common electrode and the touch electrodes for implementing detection to capacitance variations between the common electrode and the touch electrodes which are caused by touch operations.

The touch electrodes are a plurality of strips, and the number of the touch electrodes is less than the number of the gate lines such that the touch circuit executes the operation of touch detection to each touch electrode at least twice in each frame.

For solving the aforesaid technical issues, another solution provided by the present invention is: to provide a ouch detection method of a liquid crystal display, and the liquid crystal display comprises a display module and a touch module, and the display module and the touch module share a common electrode, wherein the touch detection method comprises: sequentially executing a plurality of operations of gate drive and gray scale drive in each frame by the display module; executing operations of touch detection by the touch module as the display module executes a present operation of gate drive and gray scale drive and a voltage of the common electrode is stable.

The touch detection method further comprises: finishing a present operation of touch detection before the display module executes a next operation of gate drive and gray scale drive by the touch module.

The display module comprises a gate driver, a data driver, a plurality of gate lines arranged in parallel and a plurality of data lines arranged in parallel and insulated, intersected with the gate lines, and the gate lines and the data lines define a plurality of pixel areas arranged in array, and the display module further comprises a TFT and a pixel electrode located at each pixel area, and gates of the TFTs are correspondingly coupled to the gate lines, and sources of the TFTs are correspondingly coupled to the data lines, and drains of the TFTs are correspondingly coupled to the pixel electrodes, and the common electrode and the pixel electrodes are oppositely located, and the gate driver sequentially provides gate drive signals to the gate lines for sequentially activating the TFTs corresponded with the gate lines, and the data driver provides gray scale drive signals to the data lines for applying the gray scale drive signals to the pixel electrodes via the activated TFTs, and the touch module executes the operations of touch detection as the gate driver provides the gate drive signals, and the data driver provides the gray scale drive signals, and the voltage of the common electrode is stable.

The touch module comprises touch electrodes oppositely located with the common electrode and a touch circuit coupled to the touch electrodes and the common electrode, wherein the touch circuit applies drive signals to one of the common electrode and the touch electrodes and acquires detection signals from the other of the common electrode and the touch electrodes for implementing detection to capacitance variations between the common electrode and the touch electrodes which are caused by touch operations.

The touch electrodes are a plurality of strips, and the number of the touch electrodes is less than the number of the gate lines such that the touch circuit executes the operation of touch detection to each touch electrode at least twice in each frame.

With the aforesaid technical solutions, the benefits of the present invention are: with the liquid crystal display having touch function according to the embodiment of the present invention, it is designed that the touch module executes operations of touch detection as the display module executes a present operation of gate drive and gray scale drive and a voltage of the common electrode is stable. By processing the display signals and the touch signals in time division, the interference of the display signals and the touch signals can be reduced to improve the display quality and touch effect.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

Figure 1:
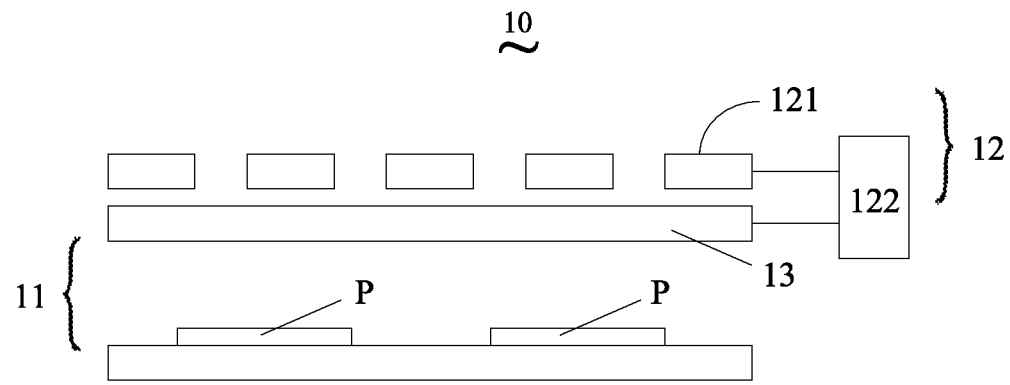
FIG. 1 is a structural diagram of a liquid crystal display according to the preferred embodiment of the present invention.

FIG. 1 is a structural diagram of a liquid crystal display according to the preferred embodiment of the present invention. As shown in FIG. 1, a liquid crystal display 10 of this embodiment comprises a display module 11 and a touch module 12. The display module 11 and the touch module 12 share a common electrode 13. The touch module 12 is employed for realizing the touch function of the liquid crystal display 10. The touch module 12 comprises touch electrodes 121 and a touch circuit 122. The touch electrodes 121 are located with the common electrode 13 and can be strips. The touch circuit 122 is respectively coupled to the touch electrodes 121 and the common electrode 13.

The common electrode 13 can be located on the color filter of the liquid crystal display 10. The display module 11 is located on the array substrate of the liquid crystal display 10.

Figure 2:
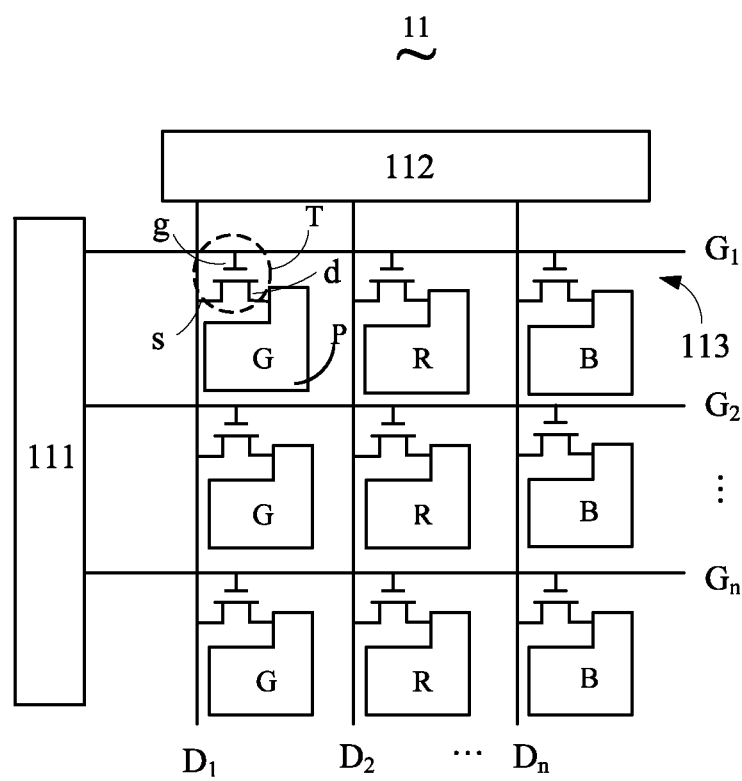
FIG. 2 is a structural diagram of a display module shown in FIG. 1 according to one embodiment of the present invention.

FIG. 2 is a structural diagram of a display module shown in FIG. 1 according to one embodiment. As shown in FIG. 2, the display module 11 is a liquid crystal display panel without touch function. The display module 11 comprises a gate driver 111, a data driver 112, a plurality of gate lines $G_1$, $G_2$, $G_n$ arranged in parallel and a plurality of data lines $D_1$, $D_2$, $D_n$ arranged in parallel and insulated, intersected with the gate lines $G_1$, $G_2$, $G_n$, and the gate lines $G_1$, $G_2$, $G_n$ and the data lines $D_1$, $D_2$, $D_n$ define a plurality of pixel areas 113 arranged in array.

Each pixel area 113 comprises a Thin Film Transistor (TFT) T and a pixel electrode P. The pixel electrodes P and the common electrode 13 are oppositely located. The Thin Film Transistor T comprises a gate g, a source s and a drain d. The pixel electrode P is correspondingly coupled to the drain d. The gate line is correspondingly coupled to the gate g. The data line is correspondingly coupled to the source s. The data drive signals are transmitted to the pixel electrode P via the source s when the Thin Film Transistor T is activated.

The gate driver 111 sequentially provides gate drive signals to the plurality of gate lines $G_1$, $G_2$, $G_n$ for sequentially activating the TFTs T corresponded with the gate lines. The data driver 112 provides gray scale drive signals to the data lines $D_1$, $D_2$, $D_n$ for applying the gray scale drive signals to the pixel electrodes P via the activated Thin Film Transistors T.

Specifically in this embodiment, one gate line drives a plurality of pixel areas 113, and the plurality of pixel areas 113 respectively shows a color G (Green), a color R (Red) and color B (Blue) as shown in FIG. 2. When the gate drive signals are transmitted via the gate lines, all the Thin Film Transistors T of the plurality of pixel areas 113 driven by the one gate line are activated, and the plurality of data lines $D_1$, $D_2$, $D_n$ transmit the gray scale drive signals to the corresponding pixel electrodes P at the same time for charging the pixel areas 113 showing different colors.

Figure 3:
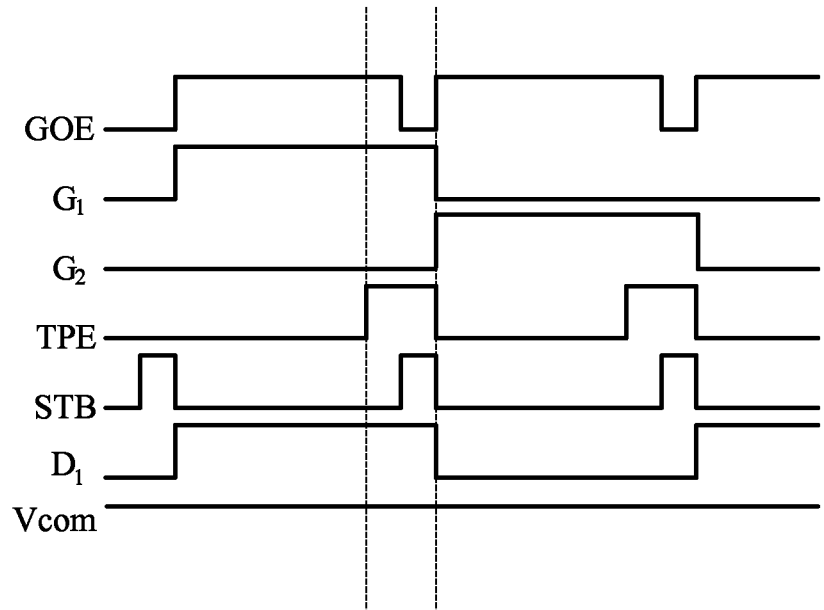
FIG. 3 is a sequence diagram of respective signals in the liquid crystal display of the present invention.

FIG. 3 is a sequence diagram of respective signals in the liquid crystal display of the present invention. As shown in FIG. 1-FIG. 3, the signal output of the gate line is controlled by the gate drive signal GOE and the signal output of the data line is controlled by the gray scale drive signal STB to make that the display module 11 executes a plurality of operations of gate drive and gray scale drive in each frame. By the touch drive signal TPE (Touch Panel Enabled), the touch circuit 122 is controlled to execute operations of touch detection. for In display stage, the gate drive signal GOE outputs high voltage level to control the gate line $G_1$ for high voltage level output and the Thin Film Transistors T is activated. Meanwhile, the gray scale drive signal STB outputs high voltage level to drive the data line $D_1$ to input a corresponding voltage value for charging the pixel area 113, accordingly. After charging is accomplished, the gate driver 111 provides gate drive signals, and the data driver 112 provides gray scale drive signals, and the voltage Vcom of the common electrode 13 becomes stable. Now, the touch drive signal TPE outputs high voltage level to instruct the liquid crystal display 10 entering the touch stage.

In touch stage, the touch circuit 122 applies drive signals to one of the common electrode 13 and the touch electrodes 121, and acquires detection signals from the other of the common electrode 13 and the touch electrodes 121 for implementing detection to capacitance variations between the common electrode 13 and the touch electrodes 121 which are caused by touch operations.

The touch module 12 further finishes a present operation of touch detection before the display module 11 executes a next operation of gate drive and gray scale drive. Specifically, as the touch stage is closed, the touch drive signal TPE outputs low voltage level for instruction. Meanwhile, the gate drive signal GOE outputs low voltage level to control the gate line $G_1$ for low voltage level output and the Thin Film Transistors T is deactivated to finish the scan to the gate line $G_1$ of the column. Then, the gate drive signal GOE outputs high voltage level to control the gate line $G_2$ to start the scan for entering the touch stage, again.

As aforementioned, the touch module 12 executes operations of touch detection as the display module 11 executes a present operation of gate drive and gray scale drive and the voltage of the common electrode 13 is stable. By processing the display signals and the touch signals in time division, the interference of the display signals and the touch signals can be reduced to improve the display quality and touch effect of the liquid crystal display 10.

Preferably, the number of the touch electrodes 121 is less than the number of the gate lines such that the touch circuit 122 executes the operation of touch detection to each touch electrode 121 at least twice in each frame. The more times the touch detections are performed, the better the touch effect of the liquid crystal display 10 can be.

Figure 4:
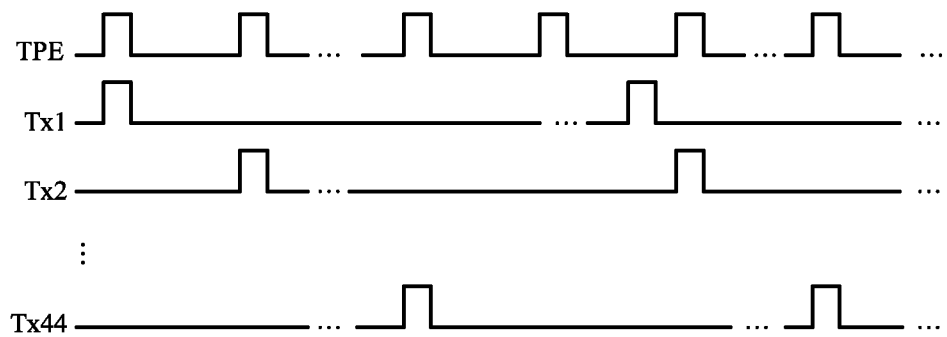
FIG. 4 is a signal sequence diagram of respective touch electrodes in the present invention.

In touch stage, the frequency of the touch detection is determined by the drive function of the touch IC. For instance, the frequency of the touch IC with 44 electrode pins (Tx pins) performing the touch detection is 120 Hz. When the display module 11 comprises 880 gate lines and the frame frequency is 60 Hz as shown in FIG. 4, the signal is transmitted to each touch electrode 121 twice in a frame period to accomplish the 120 Hz touch detection and the touch detection signal TPE is demanded to be transmitted 88 times in the frame period. Accordingly, the operations of touch detection can be ensured to occur in the predetermined period. The every interval of transmitting signals can be adjusted correspondingly according to the change of the number of the gate lines.

Figure 5:
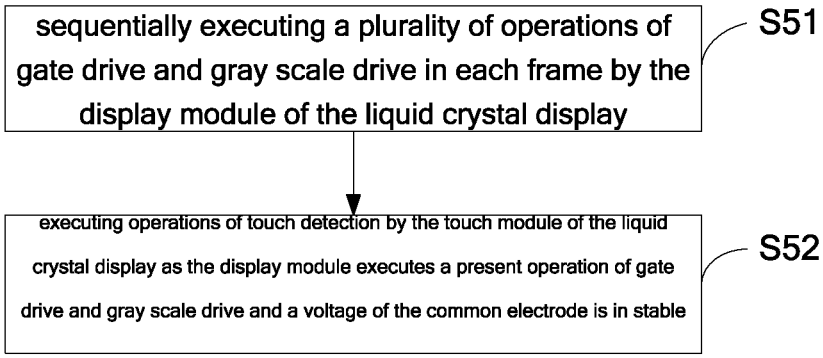
FIG. 5 is a flowchart of a touch detection method according to the preferred embodiment of the present invention.

FIG. 5 is a flowchart of a touch detection method according to the preferred embodiment of the present invention. The touch detection method is employed for the liquid crystal display 10 shown in FIG. 1 and FIG. 2 for performing touch detection. As shown in FIG. 5, the touch detection method comprises:

Step S51: sequentially executing a plurality of operations of gate drive and gray scale drive in each frame by the display module of the liquid crystal display.

Step S52: executing operations of touch detection by the touch module of the liquid crystal display as the display module executes a present operation of gate drive and gray scale drive and a voltage of the common electrode is stable.

Furthermore, the touch module finishes a present operation of touch detection before the display module executes a next operation of gate drive and gray scale drive.

The touch detection method of this embodiment can be correspondingly executed by the respective structural elements of the foregoing liquid crystal display 10. The specific procedures of the touch detection method can be referred to the working procedures in the display stage and the touch stage of liquid crystal display 10. The repeated description is omitted here.

In conclusion, with the liquid crystal display having touch function according to the embodiment of the present invention, it is designed that the touch module executes operations of touch detection as the display module executes a present operation of gate drive and gray scale drive and a voltage of the common electrode is stable. By processing the display signals and the touch signals in time division, the interference of the display signals and the touch signals can be reduced to improve the display quality and touch effect.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal display having touch function, wherein the liquid crystal display comprises a display module and a touch module, wherein the display module and the touch module share a common electrode, and the display module sequentially executes a plurality of operations of gate drive and gray scale drive in each frame, wherein the plurality of operations of gate drive and gray scale drive respectively correspond to consecutive time periods of the frame, and the touch module executes operations of touch detection as the display module executes a present operation of gate drive and gray scale drive and a voltage of the common electrode is stable, wherein the operations of touch detection are executed respectively within the time periods of the frame to which the plurality of operations of gate drive and gray scale drive correspond;

wherein the touch module finishes a present operation of touch detection before the display module executes a next operation of gate drive and gray scale drive such that the present operation of touch detection is executed within the time period corresponding to the present operation of gate drive and gray scale drive and before the next operation of gate drive and gray scale drive; and the display module comprises a gate driver, a data driver, a plurality of gate lines arranged in parallel and a plurality of data lines arranged in parallel and insulated, intersected with the gate lines, and the gate lines and the data lines define a plurality of pixel areas arranged in array, and the display module further comprises a thin-film transistor (TFT) and a pixel electrode located at each pixel area, wherein gates of the TFTs are correspondingly coupled to the gate lines, and sources of the TFTs are correspondingly coupled to the data lines, and drains of the TFTs are correspondingly coupled to the pixel electrodes, and the common electrode and the pixel electrodes are oppositely located, and the gate driver sequentially provides gate drive signals to the gate lines for sequentially activating the TFTs corresponding to the gate lines, and the data driver provides gray scale drive signals to the data lines for applying the gray scale drive signals to the pixel electrodes via the activated TFTs, and the touch module executes the operations of touch detection as the gate driver provides the gate drive signals, and the data driver provides the gray scale drive signals, and the voltage of the common electrode is stable.

2. The liquid crystal display according to claim 1, wherein the touch module comprises touch electrodes oppositely located with the common electrode and a touch circuit coupled to the touch electrodes and the common electrode, wherein the touch circuit applies drive signals to one of the common electrode and the touch electrodes and acquires detection signals from the other of the common electrode and the touch electrodes for implementing detection to capacitance variations between the common electrode and the touch electrodes which are caused by touch operations.

3. The liquid crystal display according to claim 2, wherein the touch electrodes are a number of strips, and the touch electrodes is less, in number, than the gate lines such that the touch circuit executes the operation of touch detection to each touch electrode at least twice in each frame.

4. A liquid crystal display having touch function, wherein the liquid crystal display comprises a display module and a touch module, wherein the display module and the touch module share a common electrode, and the display module sequentially executes a plurality of operations of gate drive and gray scale drive in each frame, wherein the plurality of operations of gate drive and gray scale drive respectively correspond to consecutive time periods of the frame, and the touch module executes operations of touch detection as the display module executes a present operation of gate drive and gray scale drive and a voltage of the common electrode is stable, wherein the operations of touch detection are executed respectively within the time periods of the frame to which the plurality of operations of gate drive and gray scale drive correspond.

5. The liquid crystal display according to claim 4, wherein the touch module finishes a present operation of touch detection before the display module executes a next operation of gate drive and gray scale drive such that the present operation of touch detection is executed within the time period corresponding to the present operation of gate drive and gray scale drive and before the next operation of gate drive and gray scale drive.

6. The liquid crystal display according to claim 4, wherein the display module comprises a gate driver, a data driver, a plurality of gate lines arranged in parallel and a plurality of data lines arranged in parallel and insulated, intersected with the gate lines, and the gate lines and the data lines define a plurality of pixel areas arranged in array, and the display module further comprises a thin-film transistor (TFT) and a pixel electrode located at each pixel area, wherein gates of the TFTs are correspondingly coupled to the gate lines, and sources of the TFTs are correspondingly coupled to the data lines, and drains of the TFTs are correspondingly coupled to the pixel electrodes, and the common electrode and the pixel electrodes are oppositely located, and the gate driver sequentially provides gate drive signals to the gate lines for sequentially activating the TFTs corresponding to the gate lines, and the data driver provides gray scale drive signals to the data lines for applying the gray scale drive signals to the pixel electrodes via the activated TFTs, and the touch module executes the operations of touch detection as the gate driver provides the gate drive signals, and the data driver provides the gray scale drive signals, and the voltage of the common electrode is stable.

7. The liquid crystal display according to claim 5, wherein the touch module comprises touch electrodes oppositely located with the common electrode and a touch circuit coupled to the touch electrodes and the common electrode, wherein the touch circuit applies drive signals to one of the common electrode and the touch electrodes and acquires detection signals from the other of the common electrode and the touch electrodes for implementing detection to capacitance variations between the common electrode and the touch electrodes which are caused by touch operations.

8. The liquid crystal display according to claim 7, wherein the touch electrodes are a number of strips, and the touch electrodes is less, in number, than the gate lines such that the touch circuit executes the operation of touch detection to each touch electrode at least twice in each frame.

9. A touch detection method of a liquid crystal display, wherein the liquid crystal display comprises a display module and a touch module, and the display module and the touch module share a common electrode, wherein the touch detection method comprises:

sequentially executing a plurality of operations of gate drive and gray scale drive in each frame by the display module; and executing operations of touch detection by the touch module as the display module executes a present operation of gate drive and gray scale drive and a voltage of the common electrode is stable;

wherein the plurality of operations of gate drive and gray scale drive respectively correspond to consecutive time periods of the frame; and wherein the operations of touch detection are executed respectively within the time periods of the frame to which the plurality of operations of gate drive and gray scale drive correspond.

10. The touch detection method according to claim 9, wherein the touch detection method further comprises:

finishing a present operation of touch detection before the display module executes a next operation of gate drive and gray scale drive by the touch module such that the present operation of touch detection is executed within the time period corresponding to the present operation of gate drive and gray scale drive and before the next operation of gate drive and gray scale drive.

11. The touch detection method according to claim 9, wherein the display module comprises a gate driver, a data driver, a plurality of gate lines arranged in parallel and a plurality of data lines arranged in parallel and insulated, intersected with the gate lines, and the gate lines and the data lines define a plurality of pixel areas arranged in array, and the display module further comprises a thin-film transistor (TFT) and a pixel electrode located at each pixel area, wherein gates of the TFTs are correspondingly coupled to the gate lines, and sources of the TFTs are correspondingly coupled to the data lines, and drains of the TFTs are correspondingly coupled to the pixel electrodes, and the common electrode and the pixel electrodes are oppositely located, and the gate driver sequentially provides gate drive signals to the gate lines for sequentially activating the TFTs corresponding to the gate lines, and the data driver provides gray scale drive signals to the data lines for applying the gray scale drive signals to the pixel electrodes via the activated TFTs, and the touch module executes the operations of touch detection as the gate driver provides the gate drive signals, and the data driver provides the gray scale drive signals, and the voltage of the common electrode is stable.

12. The touch detection method according to claim 10, wherein the touch module comprises touch electrodes oppositely located with the common electrode and a touch circuit coupled to the touch electrodes and the common electrode, wherein the touch circuit applies drive signals to one of the common electrode and the touch electrodes and acquires detection signals from the other of the common electrode and the touch electrodes for implementing detection to capacitance variations between the common electrode and the touch electrodes which are caused by touch operations.

13. The touch detection method according to claim 12, wherein the touch electrodes are a number of strips, and the touch electrodes is less, in number, than the gate lines such that the touch circuit executes the operation of touch detection to each touch electrode at least twice in each frame.

* * * * *